(12) United States Patent
Madhusudana et al.

(10) Patent No.: US 9,229,654 B2
(45) Date of Patent: Jan. 5, 2016

(54) INPUT/OUTPUT REQUEST SHIPPING IN A STORAGE SYSTEM WITH MULTIPLE STORAGE CONTROLLERS

(71) Applicant: LSI CORPORATION, San Jose, CA (US)

(72) Inventors: Naresh Madhusudana, Bangalore (IN); Naveen Krishnamurthy, Bangalore (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/173,540

(22) Filed: Feb. 5, 2014

(65) Prior Publication Data

US 2015/0067253 A1    Mar. 5, 2015

(30) Foreign Application Priority Data

Aug. 29, 2013    (IN) .............................. 3861/CHE/2013

(51) Int. Cl.
*G06F 3/00*    (2006.01)
*G06F 3/06*    (2006.01)
*G06F 11/20*    (2006.01)

(52) U.S. Cl.
CPC ............ *G06F 3/0659* (2013.01); *G06F 3/0611* (2013.01); *G06F 3/0617* (2013.01); *G06F 3/0683* (2013.01); *G06F 3/0689* (2013.01); *G06F 11/20* (2013.01)

(58) Field of Classification Search
None
See application file for complete search history.

(56) References Cited

U.S. PATENT DOCUMENTS

| | | | |
|---|---|---|---|
| 7,315,911 B2 | 1/2008 | Davies | |
| 7,340,555 B2 | 3/2008 | Ashmore | |
| 7,536,495 B2 | 5/2009 | Ashmore | |
| 7,793,145 B2 * | 9/2010 | Kalwitz | 714/6.12 |
| 8,205,043 B2 * | 6/2012 | Bolen et al. | 711/114 |
| 8,296,516 B2 | 10/2012 | Kawamura | |
| 8,462,502 B2 | 6/2013 | Hirano | |
| 8,572,342 B2 * | 10/2013 | Arai et al. | 711/165 |
| 8,595,313 B2 * | 11/2013 | Weber et al. | 709/212 |
| 8,725,971 B2 * | 5/2014 | Nakamura et al. | 711/162 |
| 9,052,829 B2 * | 6/2015 | Rizzo et al. | 1/1 |
| 2008/0126851 A1 * | 5/2008 | Zadigian et al. | 714/7 |
| 2011/0238909 A1 * | 9/2011 | Kumar et al. | 711/114 |

* cited by examiner

*Primary Examiner* — Farley Abad
*Assistant Examiner* — Richard B Franklin

(57) ABSTRACT

Systems and methods presented herein provide for input/output shipping between storage controllers in a storage system. One storage system comprises a plurality of logical volumes, a host driver operable to process input/output requests to the logical volumes, and a plurality of storage controllers coupled between the server and the logical volumes. A first of storage controllers is operable to receive an input/output request from the host driver for one of the logical volumes, and transfer a command to a second of the storage controllers to retrieve the data of the input/output request. The second storage controller processes the command from the first storage controller, and retrieves the data associated with the input/output request.

20 Claims, 6 Drawing Sheets

US 9,229,654 B2

INPUT/OUTPUT REQUEST SHIPPING IN A STORAGE SYSTEM WITH MULTIPLE STORAGE CONTROLLERS

This document claims priority to Indian Patent Application No. 3861/CHE/2013 (filed on Aug. 29, 2013) entitled INPUT/OUTPUT REQUEST SHIPPING IN A STORAGE SYSTEM WITH MULTIPLE STORAGE CONTROLLERS, which is hereby incorporated by reference.

FIELD OF THE INVENTION

The invention generally relates to field of storage systems operating through a host with multiple storage controllers.

BACKGROUND

Single server high availability (SSHA) storage systems have multiple controllers present in a topology, typically employing Redundant Array of Independent Disk methodologies. In some persistent reservation implementations, one storage controller has exclusive access to a particular set of logical volumes configured from a plurality of disk drives or other storage devices. Another storage controller in this implementation may have exclusive access to another particular set of logical volumes and be able to "see" logical volumes of its counterpart storage controller without being able to access those logical volumes, and vice versa. Because of this, a host driver of the server processing input/output (I/O) requests to the logical volumes may misdirect a request to a storage controller. Serial Attached Small Computer System Interface (SAS) storage controllers overcome this problem by rerouting or "shipping", the I/O request and its associated data over a SAS connection between the storage controllers. But, this implementation requires much computational processing and time to perform the transfer. Cache mirroring (e.g., in a multipath I/O system with storage controller redundancy) is another computationally intensive and lengthy implementation where data is pulled by one storage controller responding to the I/O request and transferred to the other storage controller through the SAS connection between controllers.

SUMMARY

Systems and methods presented herein provide for reducing the amount of time to process data and simplify the computational complexity in a storage system. In one embodiment, the storage system comprises a plurality of logical volumes, a host driver operable to process input/output requests to the logical volumes, and a plurality of storage controllers coupled between the host driver and the logical volumes. A first of the storage controllers is operable to receive an input/output request from the host driver for one of the logical volumes, and to transfer a command to a second of the storage controllers to retrieve the data of the input/output request. A second storage controller processes the command from the first storage controller, and retrieves the data associated with the input/output request.

The various embodiments disclosed herein may be implemented in a variety of ways as a matter of design choice. For example, the embodiments may take the form of computer hardware, software, firmware, or combinations thereof. Other exemplary embodiments are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
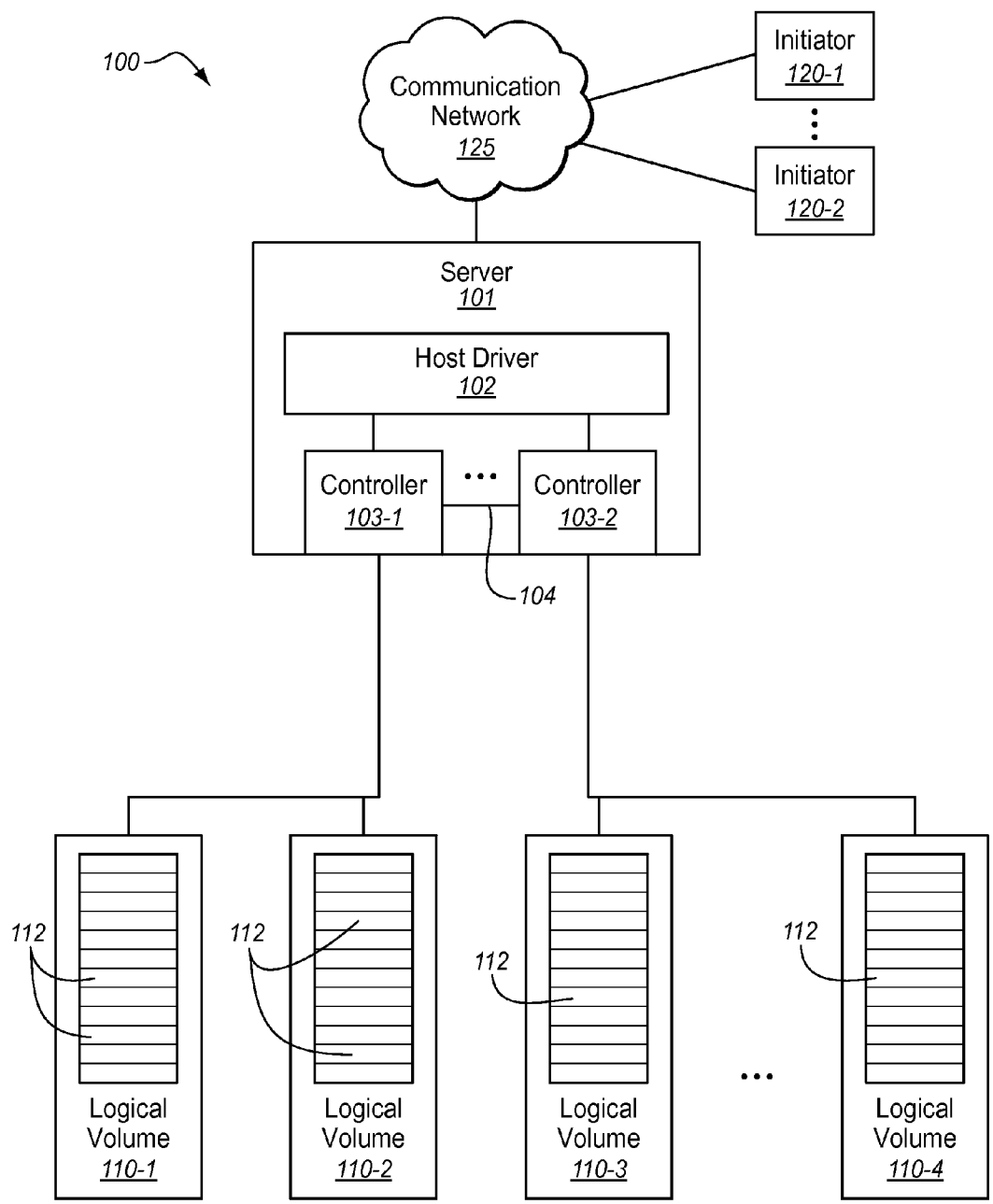
FIG. 1 is a block diagram of an exemplary storage system comprising a plurality of storage controllers.

FIG. 1 is a block diagram of an exemplary storage system 100 comprising a plurality of storage controllers 103-1-103-2 (e.g., SAS or PCIe storage controllers). The storage system 100, in this embodiment, includes a server 101 that connects to a communication network 125 to process I/O requests on behalf of a plurality of initiators 120-1-120-2. The server 101 receives the I/O requests from the initiators 120-1-120-2 where they are processed by a host driver 102 and directed to a storage controller 103 configured with the server 101. The controller 103, in turn, communicates with one or more of a plurality of logical volumes 110-1-110-4 to either write to or read from the logical volumes 110.

The storage system 100 may be configured with any number of controllers 103-1-103-2 as a matter of design choice. Additionally, the controllers 103-1-103-2 themselves may be configured for one or more purposes, such as redundancy for failovers, storage capacity expansion, and/or zoning management.

The controllers 103-1-103-2 are communicatively coupled to one another with a communication link 104 that allows the controllers 103-1-103-2 to transfer commands associated with the I/O requests amongst one another. But, the data associated with the I/O requests is left to the individual storage controllers 103-1-103-2 to retrieve as opposed to transferring the data across the communication link 104. For example, the storage controller 103-1 may receive an I/O request from the host driver 102 for the logical volume 110-4 and transfer a command to the storage controller 103-2 that directs the storage controller 103-2 to retrieve the data associated the I/O request. The storage controller 103-2 processes the command and retrieves the data associated with that I/O request (e.g., from the host driver 102 during a write I/O to the logical volume 110-4 or from a particular logical volume 110-4 during a read I/O).

The server 101 may be operable to process I/O requests on behalf of any number of initiators 120 subject to design choice and/or processing capabilities of the server 101. The initiators 120-1-120-2 may be any system or device operable to transfer I/O requests to the server 101, including computers, portable devices (e.g., smart phones and tablet computers), and the like. The communication network 125 is any network capable of transferring data, such as the Internet, local area networks, and wide-area networks.

The storage system 100 may be configured with any number of logical volumes 110 as a matter of design choice. Each of the logical volumes 110 is configured from one or more storage devices 112. Examples of storage devices include disk drives, solid state drives (SSDs), and the like. In one embodiment, one or more of the storage controllers 103-1-103-2 is operable to implement a Redundant Array of Independent Disks (RAID) management of the logical volumes 110-1-110-4 and their respective storage devices 112. The storage controllers 103-1-103-2 may also be configured for redundancy such as with multipath I/O operations, examples of such are shown and described in greater detail below.

Although shown and described herein as being configured with the server 101, the invention is not intended to be limited as such. Server based storage systems generally have multiple storage controllers so the drawings and description provide the reader with one typical example of a multi-storage controller storage system. The inventive aspects herein, however, could be implemented in other multi-storage controller storage systems. Certain operational aspects of the storage system 100 are now directed to the flowchart of FIG. 2.

Figure 2:
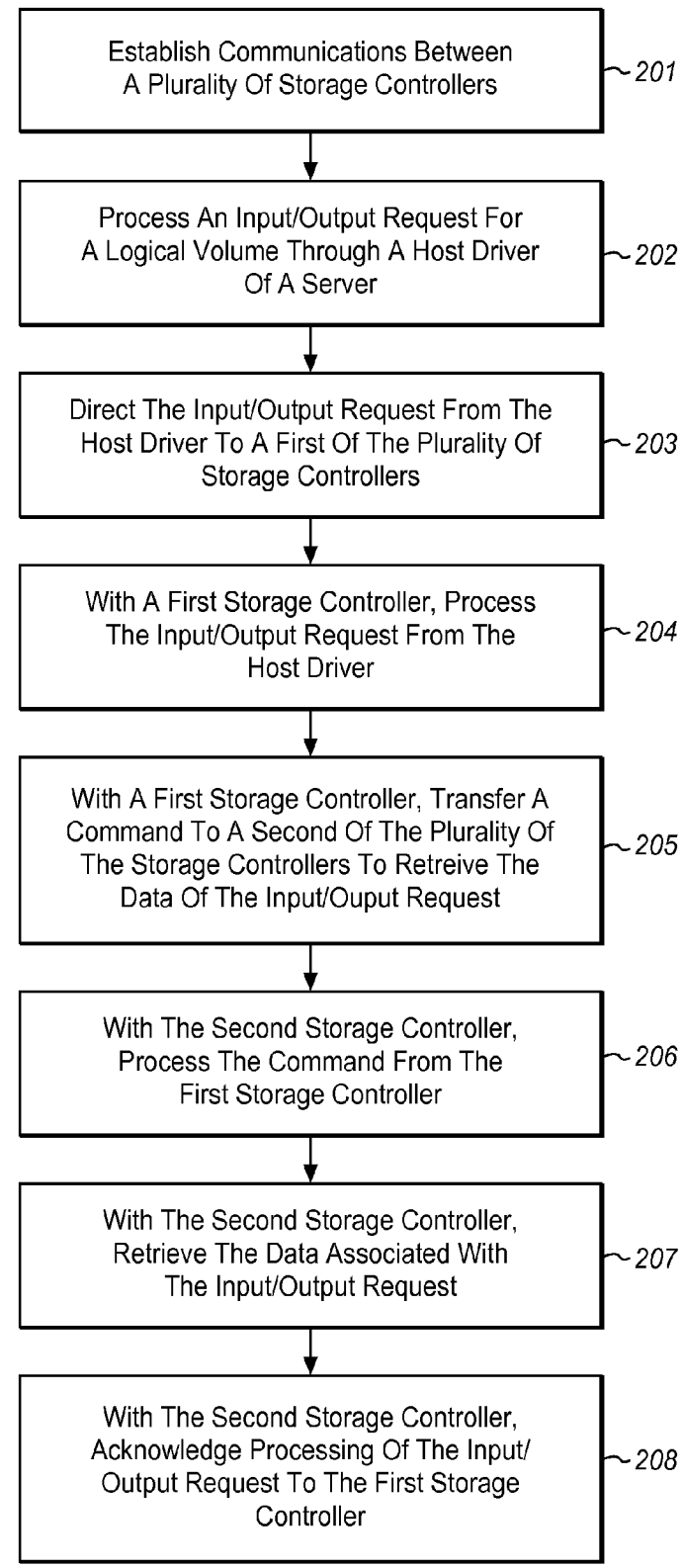
FIG. 2 is a flowchart of an exemplary process of the storage system of FIG. 1.

FIG. 2 is a flowchart of an exemplary process 200 of the storage system 100 of FIG. 1. As mentioned, the storage system 100 is configured with a plurality of storage controllers 103-1-103-2 that direct I/O requests to a plurality of logical volumes 110-1-110-4. The storage controllers 103-1-103-2 can be configured in a variety of ways as a matter design choice, including redundancy and/or zoning management configurations. In any case, the communication link 104 is established between each of the storage controllers 103-1-103-2, in the process element 201, such that the storage controllers 103-1-103-2 can communicate with one another according to their operational configurations.

In the process element 202, the host driver 102 of the server 101 receives and processes an I/O request (e.g., from one of the initiators 120-1-120-2 through the communication network 125). The host driver 102 then directs the I/O request to one of the storage controllers 103-1-103-2 (e.g., the storage controller 103-1) in the process element 203. In this example, the storage controller 103-1 processes the I/O request from the host driver 102, in the process element 204, to access a particular logical volume 110 associated with the I/O request.

In one configuration, each storage controller 103-1-103-2 may be capable of "seeing" each of the logical volumes 110-1-110-4. However, this does not necessarily mean that each storage controller 103-1-103-2 has access to each of the logical volumes 110-1-110-4. For example, the logical volumes 110-1-110-4 may be "zoned" to provide access to certain storage controllers 103 while excluding access to other storage controllers 103 as part of a desired form of management. This configuration is generally referred to as "persistent reservation". The host driver 102, in such a configuration, may inadvertently transfer an I/O request to an incorrect storage controller 103 (e.g., the storage controller 103-1). The storage controller 103-1 in this regard transfers a command to the storage controller 103-2 through the established link to direct the storage controller 103-2 to retrieve the data associated with the I/O request, in the process element 205.

Alternatively, in a redundancy configuration such as that of a multipath I/O configuration, the storage controller 103-2 may provide redundancy (e.g., a backup) for the storage controller 103-1 in case the storage controller 103-1 fails (e.g., at processing I/O requests) and vice versa. In such an embodiment, the storage controllers 103-1-103-2 are generally configured with cache memories that mirror the I/O requests being processed. The storage controller 103-1, to ensure its cache is mirrored with the storage controller 103-2, transfers a command over the established link that directs the storage controller 103-1 to retrieve the data associated with the I/O request, again in the process element 205.

Then, the storage controller 103-2 processes the command from the storage controller 103-1, in the process element 206, and retrieves the data associated with the I/O request, in the process element 207. For example, the storage controller 103-2 may be directed by the command from the storage controller 103-1 to retrieve the data of the I/O request from the host driver 102 during a write I/O request or from a logical volume 110 during a read I/O request. Once the data of the associated I/O requests is retrieved, the storage controller 103-2 acknowledges processing of the I/O request to the storage controller 103-1, in the process element 208. The storage controller 103-1 may, in turn, acknowledge fulfillment of the I/O request by the storage controller 103-2 such that the host driver 102 is assured that the I/O request has been processed and such that the host driver 102 does not wait for the I/O request to be fulfilled by the storage controller 103-1.

Figure 3:
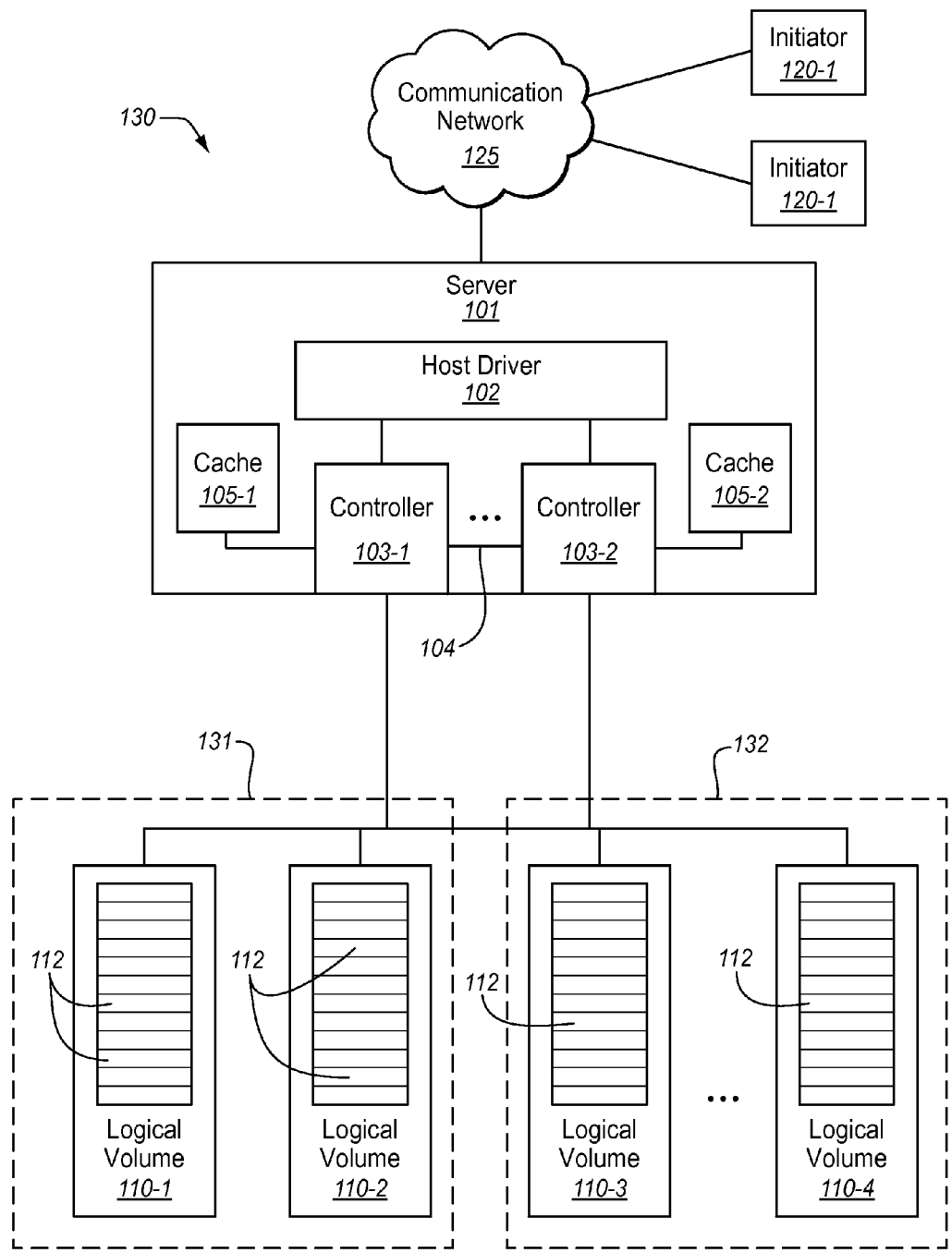
FIG. 3 is a block diagram of an exemplary storage system performing I/O shipping amongst storage controllers.

FIG. 3 is a block diagram of an exemplary server-based storage system 130 employing the storage controllers 103-1 and 103-2 in a persistent reservation configuration. In this embodiment, the logical volumes 110-1-110-4 are configured in zones 131 and 132. Each of the storage controllers 103-1 and 103-2 can "see" each of the logical volumes 110-1-110-4. However, the storage controllers 103-1-103-2, based on a predetermined management configuration, only have access to certain logical volumes 110. In this example, the storage controller 103-1 has exclusive access to the zone 131 comprising the logical volumes 110-1 and 110-2. And, the storage controller 103-2 has exclusive access to the zone 132 comprising the logical volumes 110-3 and 110-4. Thus, the storage controllers 103-1 and 103-2 are able to perform I/O requests to logical volumes 110 of their persistently reserved zones 131 and 132, although the invention is not intended be limited to any number of zones.

Also in this example, the link 104 is a Peripheral Component Interconnect Express (PCIe) link operable to transfer PCIe commands between the storage controllers 103-1 and 103-2. The storage controllers 103-1 and 103-2, however, in this example are SAS storage controllers operable to communicate with the host driver 102 and the logical volumes 110-1-110-4 via the SAS protocol. The PCIe link 104 expedites processing and communication between the storage controllers 103-1 and 103-2 without occupying SAS ports. For example, the storage controllers 103-1 and 103-2 are operable to perform I/O requests from the host driver 102. If the host driver 102 inadvertently transfers an I/O request to the storage controller 103-1 for access to the logical volume 110-4 under control of the storage controller 103-2, the controller 103-1 recognizes that it does not have access to the logical volume 110-4 and transfers a simple PCIe command to the storage controller 103-2 to retrieve the data, either from the host driver 102 for a write I/O request or from the logical volume 110-4 for a read I/O request. In this regard, the data associated with the I/O request is not retrieved by the storage controller 103-1 or transferred to the storage controller 103-2.

Again, because the data of the I/O request is not transferred, the simpler and faster communication link can be used. For example, a SAS communication link between the controllers 103-1 and 103-2 is generally established in the form of a built-up connection using the SAS protocol, occupying a SAS port of each SAS storage controller. The PCIe link 104 allows for memory transactions originating from any device to any destination device as provided by the PCIe specification. In this case, the host driver 102 may be configured with a PCIe memory where the storage controllers 103-1 and 103-2 can frame and place commands along with any data associated with the commands. An I/O request is then triggered by writing into a request register (i.e., cache memories 105-1-105-2) of the storage controller 103 which is then mapped to the PCIe memory space of the host driver 102. When the request register is written with an appropriate address, the storage controller 103 pulls the command into its local buffer such that I/O shipping can be mimicked (i.e., without the data).

The host driver 102 stores the PCIe address of the request registers for each of the storage controllers 103-1-103-2 when the storage controllers are first initialized, as is typically done to distinguish the storage controllers from one another in a RAID topology. In this regard, each of the storage controllers 103-1-103-2 has knowledge of its counterparts. Thus, when the storage controller 103-2 receives a command intended for the storage controller 103-1, the storage controller 103-2 observes the command and determines that the I/O request is associated with the storage controller 103-1. The storage controller 103-2, in turn, transfers the MPT command to the storage controller 103-1 over the PCIe link 104. The storage controller 103-1 recognizes the command from a peer storage controller and sends acceptance of the command to the storage controller 103-2.

Generally, after the acceptance by the storage controller 103-1, the storage controller 103-2 performs a cache mirroring and informs the storage controller 103-1 of such after the storage controller 103-1 pulls the command and data of the I/O request into its associated cache memory 105-1 to perform the I/O request to the appropriate logical volume 110.

After completing the cache mirroring, the storage controller 103-2 acknowledges completion to the host driver 102 indicating that the mimicked I/O request was shipped to the storage controller 103-1. The host driver 102 then waits for the completion of the I/O request by the storage controller 103-1 instead of waiting for completion of the I/O request by the storage controller 103-2.

Figure 4:
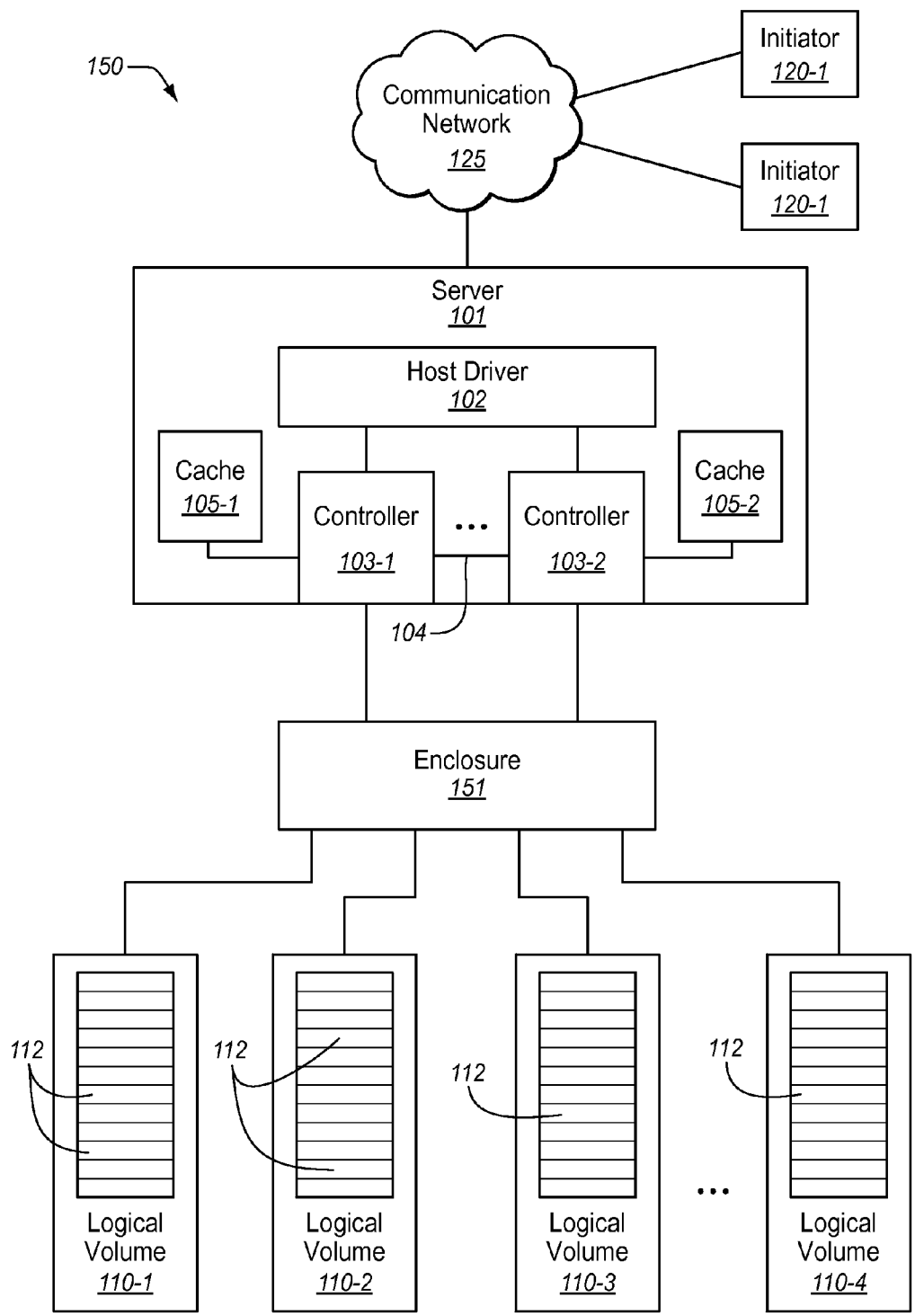
FIG. 4 is a block diagram of an exemplary storage system employing redundant storage controllers.

FIG. 4 is a block diagram of an exemplary server-based storage system 150 employing redundant storage controllers 103-1-103-2. Again, in this embodiment, the storage controllers 103-1-103-2 are linked with a PCIe link 104 to pass commands to mimic I/O shipping as discussed above without the data of the I/O request. In this multipath I/O embodiment, the cache memories 105-1-105-2 of their associated storage controllers 103-1-103-2 are mirrored in case of failure by one of the storage controllers 103. Thus, each of the storage controllers 103-1-103-2 has access to each of the logical volumes 110-1-110-4 (e.g., through some storage system logical enclosure 151).

As an example of its operation, the storage controller 103-2 pulls a command and data from the host driver 102 and determines that cache mirroring needs to be performed in the cache memory 105-1. The storage controller 103-2 transfers the command to the storage controller 103-1. The command contains information on a particular logical volume 110, the location in the logical volume the data is to be updated, and the location of the data in the memory of the host driver 102.

The command is triggered by the storage controller 103-2 by writing into its request register. When the storage controller 103-1 receives the command, it decodes a cache memory message and updates the contents of its cache memory 105-1 for the logical volume 110 and the location of the logical volume 110 associated with the I/O request. The storage controller 103-1 then retrieves the data of the I/O request from the host driver 102 as it is updating the contents of its cache memory 105-1. Afterwards, the storage controller 103-1 sends a response to the controller 103-2 that it has completed its mirroring. During such time, the storage controller 103-2 continues updating the logical volume based on the I/O request. Once the logical volume is updated, the storage controller 103-2 waits for responses from all cache mirroring commands (i.e., from all redundant storage controllers 103 in the storage system 150). Once all the commands are received, the storage controller 103-2 transfers an I/O request completion message to the host driver 102.

Generally, the data being retrieved by the storage controller 103-1 is performed in parallel with the data being retrieved by the storage controller 103-2, thus decreasing the amount of time for data processing. For example, if the storage controller 103-2 were to retrieve the data of an I/O request and direct the storage controller 103-1 to perform cache mirroring, the storage controller 103-2 would normally transfer the data to the storage controller 103-1. By directing the storage controller 103-1 to retrieve its own data, the total time for transferring data is essentially cut in half (i.e., in the case of the two storage controller 103 storage system). The overall time is decreased even more when there are more than two storage controllers 103 linked to one another to perform cache mirroring.

Another advantage of the PCIe link 104 between the storage controllers 103-1 and 103-2 is that the storage controllers 103-1 and 103-2 can free a SAS port for connection to another device. One example of how a SAS port can be freed with this storage controller 103 implementation is illustrated in FIG. 5.

Figure 5:
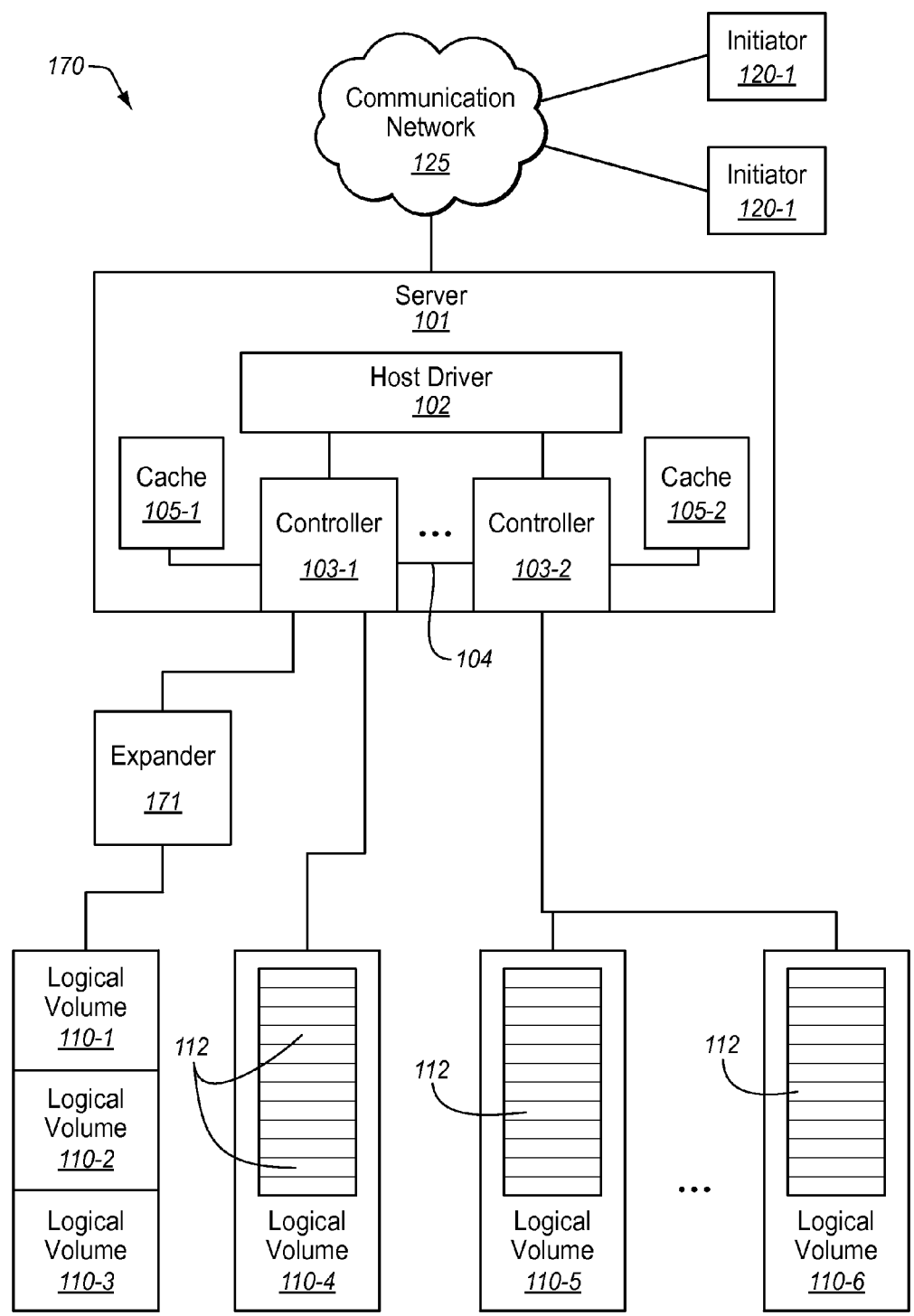
FIG. 5 is a block diagram of an exemplary storage system performing I/O shipping amongst storage controllers through a storage expander.

FIG. 5 is a block diagram of an exemplary server-based storage system 170 performing I/O shipping amongst storage controllers 103-1-103-2 through a storage expander 171. In this embodiment, the storage expander 171 occupies a SAS port of the storage controller 103-1 and is coupled to a plurality of logical volumes 110-1-110-3. Another logical volume 110-4 is coupled to another SAS port of the storage controller 103-1. Although the storage controller 103-1 is not shown with any particular number of SAS ports, it should be readily understood that SAS ports would be employed when making SAS connections between storage controllers 103. Accordingly, when these SAS ports can be freed from cache mirroring and/or I/O shipping, the SAS ports can be used for other configurations, such as expanding the storage topology of the storage system 170 via the expander 171.

Although understood by those skilled in the art, the SAS expander 171 is any device, system, software, or combination thereof operable to expand a SAS storage topology by expanding the number of individual storage devices 112 in the storage topology. Those skilled in the art will also readily recognize that the invention is not intended to be limited to any particular number of storage controllers 103 configured with the server 101. For example, two or more storage controllers 103 could be configured with the server 101 for zoning and/or redundancy purposes. Also, the storage controllers 103 may be configured as part of the server 101 or external to the server 101 as host bus adapters (HBAs).

Figure 6:
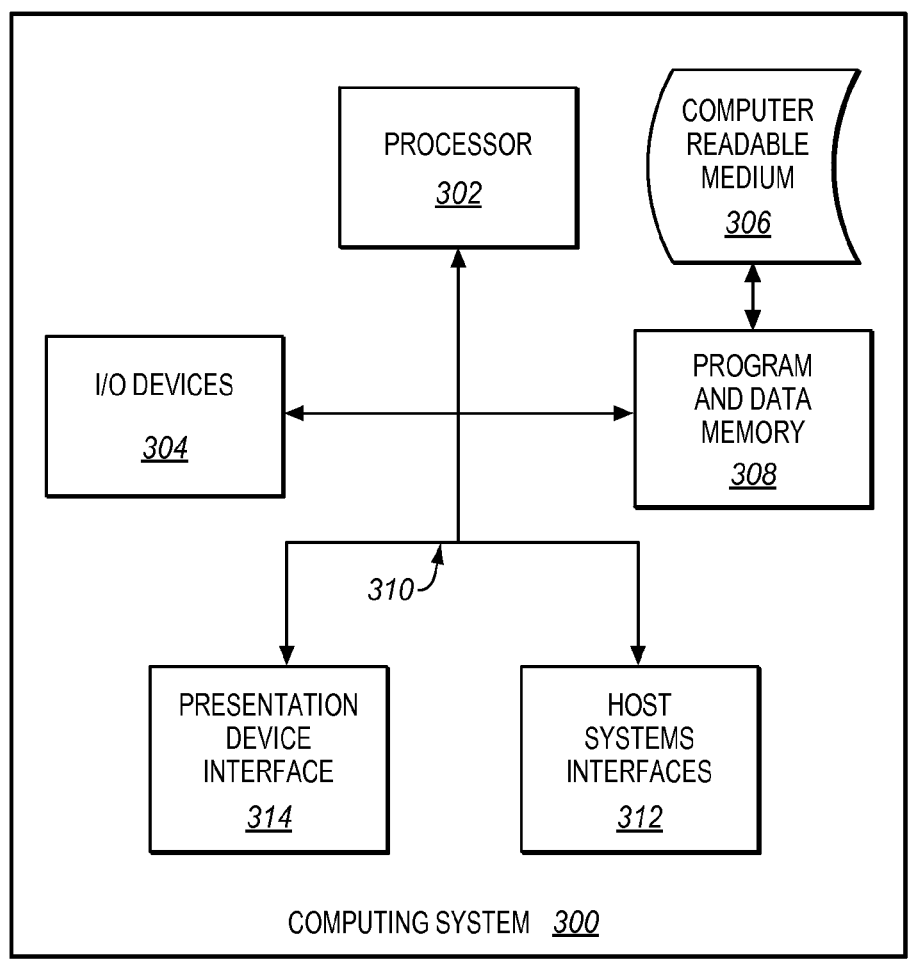
FIG. 6 is a block diagram of an exemplary computing system in which a computer readable medium provides instructions for performing methods herein.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 6 illustrates a computing system 300 in which a computer readable medium 306 may provide instructions for performing any of the methods disclosed herein.

Furthermore, the invention can take the form of a computer program product accessible from the computer readable medium 306 providing program code for use by or in connection with a computer or any instruction execution system. For the purposes of this description, the computer readable medium 306 can be any apparatus that can tangibly store the program for use by or in connection with the instruction execution system, apparatus, or device, including the computer system 300.

The medium 306 can be any tangible electronic, magnetic, optical, electromagnetic, infrared, or semiconductor system (or apparatus or device). Examples of a computer readable medium 306 include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The computing system 300, being suitable for storing and/or executing program code, can include one or more processors 302 coupled directly or indirectly to memory 308 through a system bus 310. The memory 308 can include local memory employed during actual execution of the program code, bulk storage, and cache memories which provide temporary storage of at least some program code in order to reduce the number of times code is retrieved from bulk storage during execution. I/O devices 304 (including but not limited to keyboards, displays, pointing devices, etc.) can be coupled to the system either directly or through intervening I/O controllers. Network adapters may also be coupled to the system to enable the computing system 300 to become coupled to other data processing systems, such as through host systems interfaces 312, or remote printers or storage devices through intervening private or public networks. Modems, cable modem and Ethernet cards are just a few of the currently available types of network adapters.

What is claimed is:

1. A storage system, comprising:
   a plurality of logical volumes;
   a host driver operable to process input/output requests to the logical volumes; and
   a plurality of Serial Attached Small Computer System Interface (SAS) storage controllers coupled between a server and the logical volumes and communicatively coupled to one another,
   wherein a first of the storage controllers is operable to receive a write input/output request from the host driver for one of the logical volumes via a Peripheral Component Interconnect Express (PCIE) bus, and transfer a command to a second of the storage controllers via the PCIE bus to retrieve data of the input/output request from the host driver;
   wherein the second storage controller processes the command from the first storage controller, retrieves the data of the input/output request from the host driver via the PCIE bus based on the command, and writes the retrieved data to a logical volume of the plurality of logical volumes.

2. The storage system of claim 1, wherein:
   the command transferred to the second storage controller includes information identifying the logical volume, a location in the logical volume to be updated, and a location of the data in a memory of the host driver.

3. The storage system of claim 1, wherein:
   the first storage controller is operable to receive a read input/output request, and to transfer a command to the second storage controller via the PCIE bus to retrieve data of the read input/output request from one of the logical volumes.

4. The storage system of claim 1, wherein:
   the first storage controller has exclusive access to a first set of the logical volumes;
   the second storage controller has exclusive access to a second different set of the logical volumes; and
   the input/output request is directed to the second set of the logical volumes.

5. The storage system of claim 1, wherein:
   the first and the second storage controllers each have a cache memory;
   the second storage controller provides redundancy to the first storage controller, and stores the retrieved data associated with the input/output request in its cache memory; and
   the first storage controller retrieves the data associated with the input/output request and stores the data in its cache memory.

6. The storage system of claim 1, wherein:
   each of the storage controllers are communicatively coupled to one another with a Peripheral Component Interconnect link; and
   the first storage controller transfers the command to the second storage controller via the link.

7. The storage system of claim 1, wherein:
   at least one of the logical volumes is configured from a plurality of disk drives; and
   the system further comprises a SAS expander coupled between at least one of the storage controllers and the plurality of disk drives.

8. The storage system of claim 1, wherein:
   the first storage controller acknowledges processing of the input/output request to the host driver after the second storage controller retrieves the data and fulfills the input/output request.

9. A method operable in a storage system comprising a plurality of logical volumes, the method comprising:
   establishing communications between a plurality of Serial Attached Small Computer System Interface (SAS) storage controllers;
   processing a write input/output request for a logical volume through a host driver;
   directing the input/output request from the host driver to a first of the plurality of storage controllers via a Peripheral Component Interconnect Express (PCIE) bus;
   with the first storage controller, processing the input/output request from the host driver, and transferring a command to a second of the plurality of the storage controllers via the PCIE bus to retrieve the data of the input/output request from the host driver; and
   with the second storage controller, processing the command from the first storage controller, retrieving the data of the input/output request from the host driver via the PCIE bus based on the command, and writing the retrieved data to the logical volume.

10. The method of claim 9, wherein:
    the command transferred to the second storage controller includes information identifying the logical volume, a location in the logical volume to be updated, and a location of the data in a memory of the host driver.

11. The method of claim 9, further comprising:
directing a read input/output request from the host driver to the first storage controller; and
with the first storage controller, transferring a command to the second storage controller to retrieve data of the read input/output request from one of the logical volumes.

12. The method of claim 9, further comprising:
establishing exclusive access to a first set of the logical volumes with the first storage controller;
establishing exclusive access to a second different set of the logical volumes with the second storage controller; and
directing the input/output request to the second set of the logical volumes.

13. The method of claim 9, wherein:
the first and the second storage controllers each have a cache memory;
the method further comprises establishing redundancy to the first storage controller with the second storage controller, storing the retrieved data associated with the input/output request in the cache memory of the second storage controller; and
the method further comprises retrieving the data associated with the input/output request via the first storage controller and storing the data in the cache memory of the first storage controller.

14. The method of claim 9, wherein establishing communications between a plurality of storage controllers comprises:
communicatively coupling each of the storage controllers to one another with a Peripheral Component Interconnect link, wherein the method further comprises transferring the command from the first storage controller to the second storage controller via the link.

15. The method of claim 9, wherein:
at least one of the logical volumes is configured from a plurality of disk drives; and
the method further comprises routing the I/O request through a Serial Attached Small Computer System Interface expander coupled between at least one of the storage controllers and the plurality of disk drives.

16. The method of claim 9, further comprising:
acknowledging, via the first storage controller, processing of the input/output request to the host driver after the second storage controller retrieves the data and fulfills the input/output request.

17. One or more non-transitory computer readable mediums comprising instructions that, when executed in a storage system comprising a plurality of logical volumes, direct a plurality of storage controllers to:

establish communications between the plurality of Serial Attached Small Computer System Interface (SAS) storage controllers;
process a write input/output request for a logical volume through a host driver;
direct the input/output request from the host driver to a first of the plurality of storage controllers via a Peripheral Component Interconnect Express (PCIE) bus;
with the first storage controller, process the input/output request from the host driver, and transfer a command to a second of the plurality of the storage controllers via the PCIE bus to retrieve the data of the input/output request from the host driver; and
with the second storage controller, process the command from the first storage controller, retrieve the data of the input/output request from the host driver via the PCIE bus based on the command, and write the retrieved data to the logical volume.

18. The one or more non-transitory computer readable mediums of claim 17, further comprising instructions that direct storage system to:
establish exclusive access to a first set of the logical volumes with the first storage controller;
establish exclusive access to a second different set of the logical volumes with the second storage controller; and
direct the input/output request to the second set of the logical volumes.

19. The one or more non-transitory computer readable mediums of claim 17, wherein:
the first and the second storage controllers each have a cache memory; and
the instructions further direct the storage system to:
establish redundancy to the first storage controller with the second storage controller;
store the retrieved data associated with the input/output request in the cache memory of the second storage controller;
retrieve the data associated with the input/output request via the first storage controller; and
store the data in the cache memory of the first storage controller.

20. The one or more non-transitory computer readable mediums of claim 17, wherein, in establishing communications between the plurality of storage controllers, the instructions further direct storage system to:
communicatively couple each of the storage controllers to one another with a Peripheral Component Interconnect link; and
transfer the command from the first storage controller to the second storage controller via the link.

* * * * *